United States Patent
Bordere et al.

(10) Patent No.: US 8,771,627 B2
(45) Date of Patent: Jul. 8, 2014

(54) PROCESS FOR PRODUCING CARBON NANOTUBES FROM RENEWABLE RAW MATERIALS

(75) Inventors: Serge Bordere, Jurancon (FR); Daniel Cochard, Argagnon (FR); Eric Dutilh, Cescau (FR); Patrice Gaillard, Hagetaubin (FR); André Lozowski, Lescar (FR); Dominique Plee, Lons (FR)

(73) Assignee: Arkema France, Colombes (FR)

( * ) Notice: Subject to any disclaimer, the term of this patent is extended or adjusted under 35 U.S.C. 154(b) by 649 days.

(21) Appl. No.: 12/062,687

(22) Filed: Apr. 4, 2008

(65) Prior Publication Data

US 2009/0008610 A1 Jan. 8, 2009

(30) Foreign Application Priority Data

Apr. 6, 2007 (FR) ..................................... 07 02581

(51) Int. Cl.
   *C01B 31/02* (2006.01)
(52) U.S. Cl.
   USPC ........ 423/445 B; 252/502; 423/460; 423/461; 977/742; 977/842; 977/843
(58) Field of Classification Search
   USPC ........ 252/500–511; 423/447.1, 447.2, 445 B, 423/460, 461; 977/742, 842, 843
   See application file for complete search history.

(56) References Cited

U.S. PATENT DOCUMENTS

| 6,919,064 B2* | 7/2005 | Resasco et al. ............ 423/447.3 |
| 2004/0023349 A1* | 2/2004 | Bisgaard-Frantzen et al. ............................. 435/161 |
| 2004/0234445 A1 | 11/2004 | Serp et al. |
| 2005/0276742 A1 | 12/2005 | Fan et al. |
| 2006/0104884 A1* | 5/2006 | Shaffer et al. ............. 423/445 R |
| 2006/0149109 A1* | 7/2006 | Ruziska et al. ............... 585/639 |
| 2008/0089828 A1* | 4/2008 | Soga et al. .................. 423/447.2 |

FOREIGN PATENT DOCUMENTS

| FR | 2826596 A1 | 1/2003 |
| JP | 20007070166 | * 3/2007 ............. C01B 31/02 |

OTHER PUBLICATIONS

Corrias et al. ("Carbon nanotubes produced by $uidized bed catalytic CVD: first approach of the process." Chem Eng Sc, 58, p. 4475-4482, 2003).*
G. Wang, et al., Applied Catalysis B: Enviromental (2008) doi:10.1016/j.apcath 2008.09.008.
W. Li, et al., Applied Catalysis B: Environmental (2008) doi:10.1016/j.apcath.2008.04.026.
Database WPI Week 200728, Derwent Publication Ltd., London, GB; AN 2007-287434, XP002459766 & JP 2007 070166 A (Chugai Ro Kogyo Kaisha Ltd) Mar. 22, 2007.
Database CA [Online], Chemical Abstracts Service, Apr. 20, 2006, Petersen, Elijah et al., "Synthesis of Carbon-14 Labeled Multi-Walled Carbon Nanotubes and Quantification of Their Uptake by Ecological Receptors", XP002481450, Database Accession No. 144:336057.
European Search Report for EP08103248 dated May 26, 2008.
French Search Report for FR695755 dated Nov. 23, 2007.
H.A. Webber, "Cellulose from Cornstalks," Industrial & Engineering Chemistry 1929, 21 (3), 270-275.
"Alumina (Aluminium Oxide)—The Different Types of Commercially Available Grades," <http://www.azom.com/article.aspx?ArticieID=1389> AZoM.com May 3, 2002. Accessed Dec. 6, 2011.

* cited by examiner

*Primary Examiner* — Tri V Nguyen
(74) *Attorney, Agent, or Firm* — McDonnell Boehnen Hulbert & Berghoff LLP

(57) ABSTRACT

A subject of the present invention is a process for producing carbon nanotubes, the process comprising:
- a) the synthesis of alcohol(s) by fermentation of at least one vegetable matter and optionally the purification of the product obtained;
- b) the dehydration of the alcohol or alcohols obtained in a) in order to produce, in a first reactor, a mixture of alkene(s) and water and optionally the purification of the product obtained;
- c) the introduction, in particular the introduction into a fluidized bed, in a second reactor, of a powdery catalyst at a temperature ranging from 450 to 850° C., this catalyst comprising at least one catalytic metal supported by an inert solid substrate, the grains of catalyst having a d50 of less than 300 μm;
- d) bringing the alkene produced in b) into contact with the powdery catalyst of stage c), optionally in a fluidized bed, in order to form carbon nanotubes and hydrogen on the surface of said catalyst by catalytic decomposition of said alkene;
- e) the recovery of the carbon nanotubes produced in d).

Figure 1:
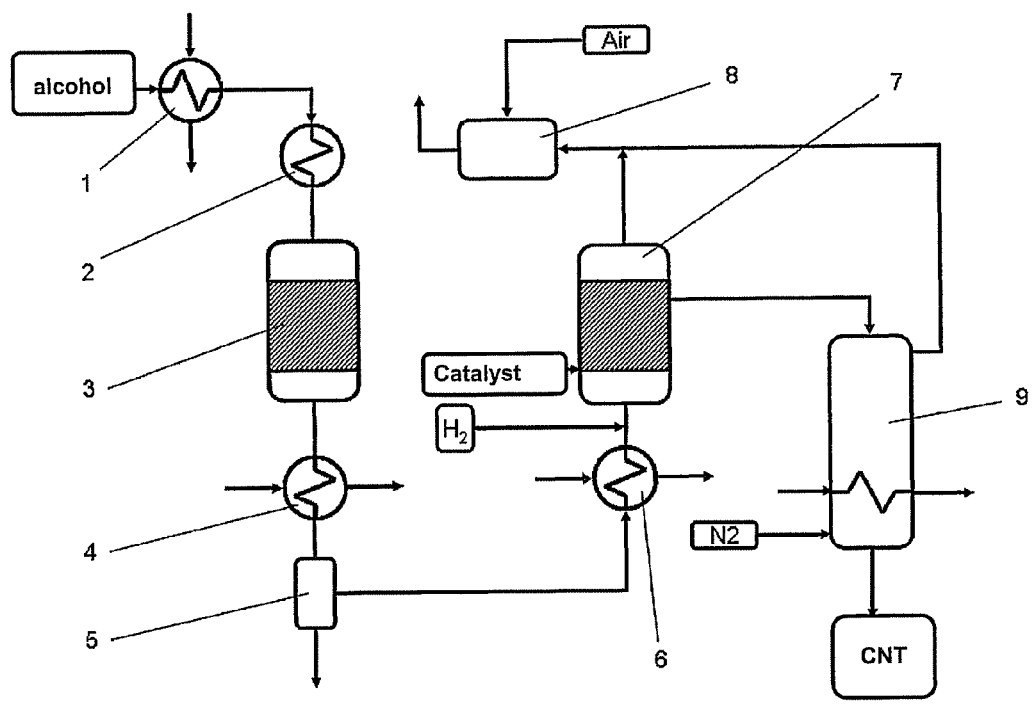

The invention also relates to nanotubes capable of being obtained according to the abovementioned process, which can be advantageously used in all the known fields of application of carbon nanotubes.

8 Claims, 2 Drawing Sheets

PROCESS FOR PRODUCING CARBON NANOTUBES FROM RENEWABLE RAW MATERIALS

FIELD OF THE INVENTION

The present invention relates to an industrial process for producing carbon nanotubes from renewable raw materials.

More precisely, a subject of the invention is a process for producing carbon nanotubes (abbreviation: CNTs) using as a source of carbon an alkene such as ethylene obtained by dehydration of an alcohol such as ethanol originating from the fermentation of vegetable matter. Vegetable matter has the advantage, according to the Application, of being able to be cultivated in large quantities throughout most of the world, and of being renewable.

DESCRIPTION OF THE RELATED ART

CNTs have, for the last few years, been the subject of intensive research, with a view to replacing carbon black which is volatile and difficult to handle in all its applications. CNTs moreover have the advantage of conferring upon any composite material containing them, improved mechanical properties and electric and/or thermal conduction properties at least equal to those of carbon black with lower contents. Their good mechanical properties and in particular their elongation resistance are linked in part to their very high aspect ratios (length/diameter).

They are composed of one or more graphite sheets arranged concentrically about a longitudinal axis. For nanotubes composed of a single sheet, the term SWNT (Single Wall Nanotubes) is used and for nanotubes composed of several concentric sheets, the term MWNT (Multi Wall Nanotubes) is used. The SWNTs are in general more difficult to produce than the MWNTs.

The carbon nanotubes can be produced according to different processes such as electrical discharge, laser ablation, chemical vapour deposition (abbreviation: CVD) or physical vapour deposition (abbreviation: PVD).

According to the Applicant, the process for producing the CNTs which are most promising in terms of quality of the CNTs, reproducibility of the characteristics of the CNTs, and productivity is the CVD process. This process involves injecting a source of carbon-rich gas into a reactor containing a metal catalyst heated to a high temperature; on contact with the metal, the gas source breaks down into graphite-level CNTs and hydrogen. In general, the catalyst is constituted by a catalytic metal such as iron, cobalt, nickel, molybdenum, supported by a solid substrate, in the form of grains, and chemically inert, such as alumina, silica, magnesia or also carbon.

The gaseous carbon sources generally used are methane, ethane, ethylene, acetylene and benzene.

As examples of documents describing this CVD process, there can be mentioned Hyperion Catalysis International Inc.'s document WO 86/03455 which can be considered as one of the basic patents on the synthesis of CNTs; this document describes essentially cylindrical carbon fibrils (former name for CNTs), the diameter of which is comprised between 3.5 and 70 nm and the aspect ratio of which is greater than or equal to 100, as well as their preparation process.

The CNTs are synthesized by bringing a catalyst containing iron (for example $Fe_3O_4$, Fe on a carbon support, Fe on an alumina support or Fe on a carbon fibril support) into contact with a carbon-rich gaseous compound, such as a hydrocarbon, in the presence of another gas which is capable of reacting with the carbon-rich gaseous compound; the synthesis is carried out at a temperature chosen from the range from 850° C. to 1200° C. The catalyst is prepared by dry impregnation, by precipitation or by a wet impregnation process.

No information is given on the productivity (which would be expressed as the mass of fibrils formed per gram of catalyst and per unit of time), apart from the fact that, in the case where the gaseous compound containing carbon is benzene, work must be carried out at a temperature above 800° C.

Other documents describe improvements in this process, such as the use of a continuous fluidized bed of catalyst, which makes it possible to control the state of aggregation of the catalyst and of the carbonaceous materials formed (see for example WO 02/94713A1 in the name of the University of Tsinghua and FR 2 826 646 INPT).

The CNTs produced "bind" to the grains of the catalyst in the form of an interlocked three-dimensional network, forming aggregates typically of the order of 300 to 600 µm.

The CNTs thus obtained can be used as they are in most of the applications; but it is also possible to subject them to a subsequent additional purification stage, intended to separate the CNTs from the grains of the catalyst support.

The size limit of the CNT aggregates is for example reached when all the available catalytic sites have reacted and/or when the interlocking of the CNTs around the support reduces the diffusion of the reactive gases (carbon source) towards the catalytic sites as well as the surface of catalyst which can react.

The process used mostly for the production of the gaseous sources of carbon such as the gaseous hydrocarbons is based on high temperature cracking of petroleum cuts. This process, requiring high temperatures (at least 800° C.), consumes a great deal of energy. Moreover, it utilizes petroleum, deposits of which are rapidly becoming exhausted; its extraction is becoming more and more difficult (wells of great depths), requiring heavy and expensive equipment, having to resist high temperatures (400-500° C.). The production cost of the cracking gases increases from day to day, which is contrary to the low-cost mass production of CNTs, an essential condition for ensuring commercial outlets in the applications involving polymers and resins loaded with CNTs.

Up to now, there has been no interest in industrial processes for the production of the gaseous sources of carbon upstream of CNT production.

The document JP2007-070166 admittedly discloses a process for the production of carbon nanotubes from a source of carbon of vegetable origin. This process cannot however be exploited on an industrial scale. In fact, the source of carbon originates from the gasification of a biomass by thermal decomposition at 700° C. followed by reforming at 1150° C. This process generates a mixture of various molecules, rich in heavy liquid hydrocarbons. The carbon nanotubes formed from this source of carbon are impure and have a high coke-metal ratio. Obtaining carbon nanotubes of acceptable quality requires high purification costs which, added to the energy costs associated with the high-temperature gasification process, have a negative effect on the economics of the process.

The process according to the invention makes it possible to dispense with the consumption of petroleum, reduce energy consumption, and resort to gaseous sources originating from vegetable cultivation. It also makes it possible to obtain carbon nanotubes of good quality and in particular of a purity suitable for demanding industrial applications, in particular in the field of electronics.

In addition to the abovementioned advantages, the CNT production process according to the invention makes it possible to significantly improve the productivity of the catalyst utilized, without the need for an additional purification stage. It also allows the recycling of the by-products synthesized during the production of the CNTs, a lower production cost and a favourable energy balance.

SUMMARY OF THE INVENTION

In a more precise manner, a subject of the invention is a process for producing carbon nanotubes, comprising the following stages:

a) the synthesis of alcohol(s) by fermentation of at least one vegetable matter and optionally the purification of the product obtained;

b) the dehydration of the alcohol or alcohols obtained in a) in order to produce, in a first reactor, a mixture of alkene(s) and water and optionally the purification of the product obtained;

c) the introduction, in particular the introduction into a fluidized bed, in a second reactor, of a powdery catalyst at a temperature ranging from 450 to 850° C., this catalyst comprising at least one catalytic metal supported by an inert solid substrate, the grains of catalyst having a d50 of less than 300 μm;

d) bringing the alkene product in b) into contact with the powdery catalyst of stage c), optionally in a fluidized bed, in order to form carbon nanotubes and hydrogen on the surface of said catalyst by catalytic decomposition of said alkene;

e) the recovery of the carbon nanotubes produced in d).

The first stage of the process according to the invention comprises the fermentation of at least one vegetable matter in order to produce alcohol. This vegetable matter can in particular be chosen from the sugars, starch and plant extracts containing them, among which there can be mentioned beet, sugar cane, cereals such as wheat, barley, sorghum or corn, as well as potatoes, without this list being limitative. It can alternatively be biomass (a mixture of cellulose, hemicellulose and lignin). Ethanol is then obtained by fermentation, for example using *Saccharomyces cerevisiae* or its mutant. In a less preferred variant, the vegetable matter can be a source of cellulose, such as straw, wood or paper, which can lead by fermentation, in particular using *Clostridium thyrobutylicum* or *acetobutylicum* or their mutants, to the production of propanol and/or butanol. The vegetable matter utilized is generally found in hydrolyzed form before the fermentation stage. This preliminary hydrolysis stage thus allows, for example, the saccharification of the starch in order to convert it to glucose, or the conversion of sucrose to glucose.

These fermentation processes are well known to a person skilled in the art. They comprise for example the fermentation of vegetable matter in the presence of one or more yeasts or mutants of these yeasts (micro-organisms naturally modified in response to a chemical or physical stress), followed by distillation making it possible to recover the alcohol, in particular ethanol, in the form of more concentrated aqueous solution which is then treated with a view to also increasing its molar concentration of alcohol such as ethanol.

The alcohol obtained in this first stage of the process according to the invention can optionally be purified. In particular, the ethanol is generally obtained in a mixture with heavier alcohols, so-called fusel alcohols, the composition of which depends on the vegetable matter used and on the fermentation process. The latter generally comprise approximately 50% isoamyl alcohol (C5) and a few percentages of C3 and C4 alcohols (isobutanol). It is therefore preferable according to the invention to carry out purification of the alcohol produced by fermentation, for example by absorption on molecular sieve, carbon black or zeolite type filters.

In the second stage of the process according to the invention, the alcohol obtained by fermentation is dehydrated in a first reactor in a mixture of alkene and water. It is preferable for the alcohol to be injected at the top of the first reactor. This dehydration stage is generally carried out in the presence of a catalyst, which can in particular be silicalite-based in the case of propanol or γ-alumina-based in the case of ethanol. An example of a catalyst suited to the dehydration of ethanol is in particular marketed by EUROSUPPORT under the trade name ESM 110®. It is an undoped trilobed alumina containing little residual $Na_2O$ (usually 0.04%). A person skilled in the art is able to choose the optimum operating conditions for this dehydration stage. By way of example, it has been demonstrated that a ratio of the volumetric flow rate of liquid ethanol to the volume of catalyst of 1 $h^{-1}$ and an average temperature of the catalytic bed of 400° C. led to a virtually total conversion of the ethanol with an ethylene selectivity of the order of 98%.

The alkene obtained in this stage of the process according to the invention can optionally be constituted by a mixture of alkenes, in particular in the case where the alcohol produced by fermentation was constituted by a mixture of ethanol and fusel alcohols and has not been purified at the end of stage (a). It is therefore advantageous in this case to provide a stage of purification of the alkenes obtained at the end of stage (b), for example by absorption on molecular sieve, carbon black or zeolite type filters.

The alkene obtained in this second stage is preferably constituted only or mostly by ethylene. It is intended to be converted to carbon nanotubes by passing over a powdery catalyst, advantageously in a fluidized bed.

This catalyst comprises at least one catalytic metal, preferably iron, supported by an inert solid substrate. This powdery catalyst can in particular be produced by impregnation of the solid substrate by an aqueous solution of said catalytic metal, preferably under mechanical stirring and for example at a temperature of 100° C. to 150° C., then calcination of the solid substrate thus impregnated, in particular at a temperature of 200° C. to 400° C. The d50 of the grains of catalyst is less than 300 μm, preferably less than 200 μm and preferentially greater than 100 μm. By "d50" is meant in this description the diameter than which 50% by volume of the particles are smaller, as measured by laser granulometry, in particular using a Malvern-type apparatus.

In the third stage of the process according to the invention, this catalyst is advantageously introduced (preferably without having been subjected to any additional treatment) into a fluidized bed in a second reactor at a temperature of 450 to 850° C. and preferably 500 to 700° C. The residence time of the catalyst in the fluidized bed can in particular be comprised between 30 minutes and 3 hours and be for example approximately one hour.

As a variant, stage (c) can be implemented in a fixed bed, in a horizontal or inclined tubular reactor, the catalyst being introduced at one of the ends (at the top part in the case of an inclined reactor) and the gas at the other end. The tubular reactor can optionally be rotated about its longitudinal axis, as described in particular in the document FR 1 445 236.

Then, in a fourth stage, the alkene product in b) is brought into contact with the powdery catalyst of stage c), optionally in a fluidized bed, in order to form carbon nanotubes and hydrogen at the surface of said catalyst by catalytic decomposition of said alkene. Operating in a fluidized bed makes it possible to optimize the contact between the gases, in particular the alkene and the catalyst.

In this stage, it is preferable for the alkene to be mixed with a flow of hydrogen and/or with at least part of the water produced during the dehydration of the alcohol in b), which can in this case be injected into the second reactor at the same time as the alkene produced. It is moreover preferable for this gaseous mixture to be injected at the bottom of the second reactor.

The conversion rate of the alkene such as ethylene can be measured by continuous chromatography in order to evaluate when the reaction is finished.

The hydrogen produced by the reaction and the used gases can be removed at the top of the reactor and burnt off, or the hydrogen produced in this stage can be conveyed at least in part into a thermal oxidizer for combustion of the gases produced during stages a) to e) and/or recycled at least in part into the second reactor. As a variant, the hydrogen produced during this fourth stage can be reinjected into the second reactor.

The carbon nanotubes produced in this fourth stage are recovered in the fifth stage of the process according to the invention. They are in that case bound to grains of catalyst and can be used as they are in their different applications. As a variant, it is however possible to provide an additional stage making it possible to separate the carbon nanotubes from the grains of catalyst. According to the invention it is preferable for the recovery of the carbon nanotubes to be sequenced.

In a preferred embodiment of the invention, stages c) to e) above are continuously implemented simultaneously in the second reactor. According to a preferred form of the invention, the powdery catalyst is injected into the second reactor in pulses, with continuous injection of the gases at the bottom and recovery of the CNTs produced by overflow at the top of the reactor.

Advantageously, the process according to the invention, comprises a stage of grinding the CNTs obtained during stage d) and/or e) in order to de-agglomerate the optionally interlocked CNTs, formed on the catalyst, and thus reduce their granulometry. This grinding stage also makes it possible to make active catalytic sites of the catalyst accessible; in fact, the interlocking of the CNTs around the catalyst reduces the diffusion of the gaseous reactive mixture (mixture of alkene and water) towards the catalytic sites as well as the reactive surface of the catalyst. Improved productivity of the catalyst follows from this grinding stage.

This grinding stage can be implemented at low or high temperatures and be carried out according to known techniques using equipment such as a ball, hammer, burr or cutting mill, gas jet or any other grinding system capable of reducing the size of the interlocked network of CNTs. According to the invention, this grinding stage is such that it makes it possible to reduce the size of the particles to a d50 of less than 200 µm, whilst allowing their subsequent utilization (stage c) according to a CVD technique (preferably in a fluidized bed), which would not be possible if the d50 of the CNTs at the end of the grinding stage was less than 100 µm.

In a preferential manner, the grinding stage is carried out according to a gas-jet grinding technique. The gases used as an energy supply can advantageously be the incoming reactive gases.

The grinding device can be placed either in an external loop allowing the optional total or partial recycling of the ground CNTs within the reactor (ex-situ grinding), or advantageously placed inside the CNT synthesis reactor (second reactor).

Thus, at least part of the CNTs, originating from stage d) can be extracted from the CNT production reactor towards a continuously operating grinding device, then injected into the second reactor.

It is therefore also possible to carry out the grinding in the CNT production reactor, which avoids extracting the powder from the reactor and therefore limits the load losses and the risks of the powders flying off; the productivity is therefore improved.

The grinding device generally uses a system of high-speed gas jets generated via injectors which entrain the CNT powder over targets maintained by a support, thus making it possible to reduce the granulometry by impact. The fluidization can be carried out by these injectors alone and/or associated with a gaseous flow diffused by a distributor arranged around these injectors. The dimensions of the grinding system and the used gas inlet flow rates are suited to obtaining a good fluidization and the desired granulometry, depending on the hardness and the density of the catalyst support.

A subject of the present invention is also the carbon nanotubes which can be obtained according to the process described previously. These CNTs are characterized in that they comprise carbon of renewable origin, i.e. $^{14}C$. In fact, all the samples of carbon taken from living organisms, and in particular from the vegetable matter used in the first stage of the process according to the invention, are a mixture of three isotopes: $^{12}C$, $^{13}C$ and $^{14}C$ in a $^{14}C/^{12}C$ ratio kept constant by a continuous exchange of carbon with the environment and which is equal to $1.2 \times 10^{-12}$. Although the $^{14}C$ is radioactive and its concentration therefore decreases over time, its half-life is 5730 years, so that it is estimated that the $^{14}C$ content is constant from extraction from the vegetable matter up to the production of the CNTs and even up to the end of their use.

More precisely, it is considered that the CNTs obtained according to the invention contain at least 20% by mass, preferably at least 50% by mass, of carbon of renewable origin relative to the total mass of carbon. In other words, they contain at least $0.2 \times 10^{-10}\%$ by mass of $^{14}C$, preferably at least $0.6 \times 10^{-10}\%$ by mass of $^{14}C$.

The $^{14}C$ content of the CNTs can be measured for example according to the following techniques:

By liquid scintillation spectrometry: this method involves counting 'Beta' particles originating from the disintegration of the $^{14}C$. The Beta radiation originating from a sample of known mass (known number of carbon atoms) over a certain period of time. This 'radioactivity' is proportional to the number of $^{14}C$ atoms, which can thus be determined. The $^{14}C$ present in the sample emits β-radiation which, on contact with the scintillating liquid (scintillator) produces photons. These photons have different energies (comprised between 0 and 156 keV) and form what is known as a $^{14}C$ spectrum. According to two variants of this method, the analysis relates either to the $CO_2$ previously produced by the carbonaceous sample in an appropriate absorbent solution, or to the benzene after prior conversion of the carbonaceous sample to benzene.

By mass spectrometry: the sample is reduced to graphite or to gaseous $CO_2$, analyzed in a mass spectrometer. This technique uses an accelerator and a mass spectrometer in order to separate the $^{14}C$ ions from the $^{12}C$ ions and thus determine the ratio of the two isotopes.

These methods for measuring the $^{14}C$ content of the materials are described precisely in the standards ASTM D 6866 (in particular D6866-06) and in the standards ASTM D 7026 (in particular 7026-04). These methods measure the $^{14}C/^{12}C$ ratio of a sample and compare it with the $^{14}C/^{12}C$ ratio of a reference sample of 100%-renewable origin, in order to produce a relative percentage of carbon of renewable origin in the sample.

The measurement method preferentially used in the case of CNTs is the mass spectrometry described in the standard ASTM D6866-06 "accelerator mass spectroscopy".

The CNTs according to the invention can be used in all the applications where CNTs are utilized, in particular in fields where their electrical properties are sought (depending on the temperature and their structure, they can be conductors, semi-conductors or insulators), and/or in fields where their mechanical properties are sought, for example for the reinforcement of composite materials (the CNTs are a hundred times stronger and six times lighter than steel). For example there can be mentioned the use of CNTs in macromolecular compositions intended for example for the packaging of electronic components, the production of fuel lines, antistatic coatings, in thermistors, electrodes for supercapacitors, etc.

The invention is described in more detail with reference to the following examples which are given purely as illustrations and are by no means limitative, and with reference to the attached drawings, in which:

FIG. 1 is a general view of the process according to the invention, and

Figure 2:
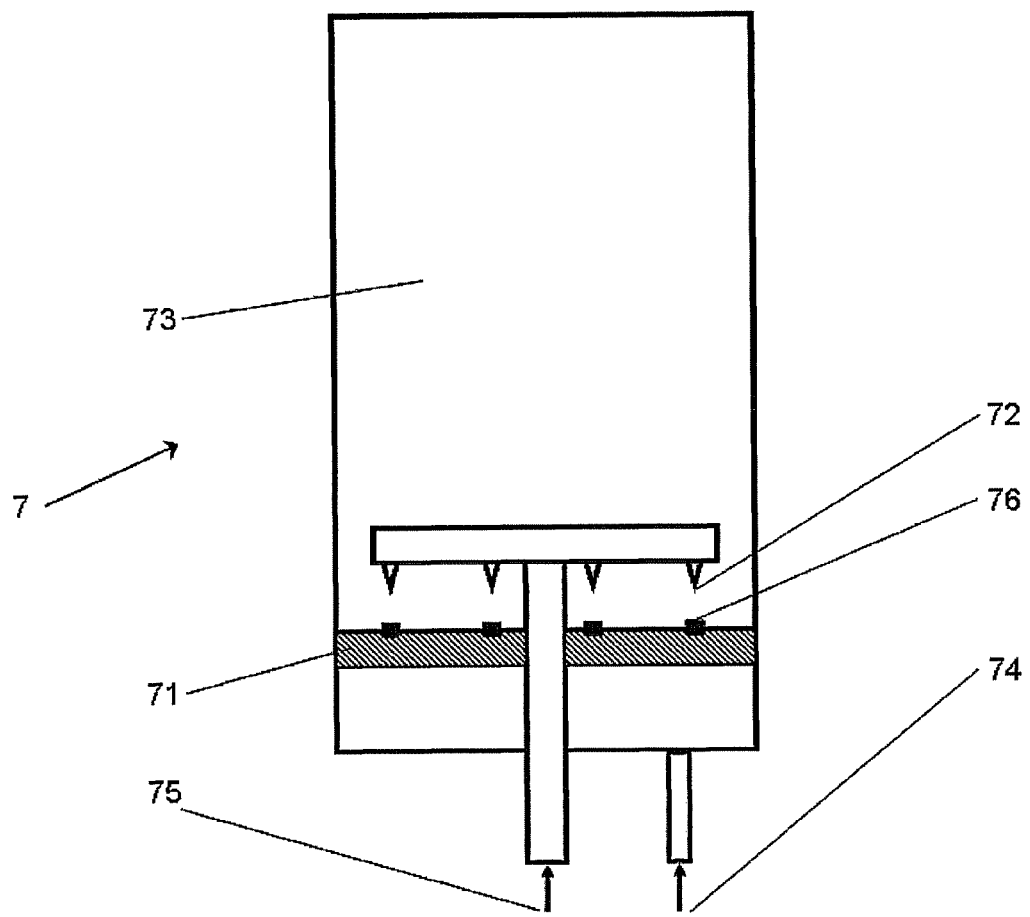

The FIG. 2 illustrates a grinding device installed inside the CNT synthesis reactor.

EXAMPLES

Example 1

CNT Synthesis Process

As illustrated in FIG. 1, the process according to the invention can be implemented in an installation comprising an ethanol dehydration zone, a CTN synthesis zone and a gaseous effluents treatment zone, the whole assembly making it possible to continuously produce CNTs.

In this installation, 96% ethanol is vaporized in a vaporizer 1, then preheated in a heat exchanger 2, before being injected into the top of a first reactor 3 with a diameter of 127 mm containing a catalytic bed heated to 300-400° C. and constituted by a layer of ESM110 alumina from EUROSUPPORT, representing a volume of 12700 cm$^3$ and a mass of 6500 g, the ratio of the volumetric flow rate of ethanol to the volume of catalyst being 1 h$^{-1}$. The mixture of water and ethylene produced in the reactor is cooled down in the heat exchanger 4, before being conveyed to a gas-liquid separator 5 where the ethylene and the water (optionally mixed with by-products) are separated.

The ethylene thus separated is then preheated in a heat exchanger 6, then conveyed to the bottom of a second reactor 7 with a diameter of 25 cm and effective height of 1 m heated to 700° C.

The catalyst was prepared by impregnation of a solution of iron nitrate on a Puralox SCCA 5-150 gamma alumina with a median diameter equal to approximately 85 μm; the impregnation was carried out in a fluidized bed under a flow of air at 100° C. in order to keep the powder dry throughout the operation. At the end of the impregnation, the powder obtained was calcined under air at 200° C. in a fluidized bed for 8 hours then in a fixed bed at 400° C. for 16 hours.

This catalyst in the powder form is then introduced by pulses of approximately 50 g into the reactor 7 which is simultaneously supplied with ethylene at a flow rate of 4000 NL/h, and hydrogen at a flow rate of 1000 NL/h, which corresponds to a partial ethylene pressure of 0.80.

A chromatographic analysis of the output gases from the reactor 7 makes it possible to monitor the conversion of the ethylene to CNTs.

These gases are mostly made up of hydrogen and also contain a small proportion of ethylene and optionally methane and ethane.

When the conversion of the ethylene to CNTs is less than 70%, a new injection of catalyst into the reactor is carried out.

The CNTs (bound to the grains of catalyst) are recovered by overflow into a gas/cooled solid separator 9 where they are subjected to nitrogen flushing intended to purge the CNT powder of combustible gas residues. This operation makes it possible to recover, on the one hand, the crude CNTs having a d50 of 420 μm and a purity of approximately 93% and, on the other hand, the used nitrogen which is conveyed, like the output gases, to a thermal oxidizer 8.

Example 2

CTN Synthesis Process Comprising an In Situ Grinding Stage

The process described in Example 1 is repeated, except that gas-jet grinding of the CNTs is carried out in their synthesis reactor.

The grinding is carried out at the synthesis temperature in a CTN synthesis reactor 7 according to FIG. 2 provided with a porous distributor 71 equipped with a manifold of nozzles 72 allowing the high-speed injection of gas 75 impacting the CNT powder on the complete targets 76 fixed on the distributor. The medium 73 is fluidized by means of this stream of gas 75, as well as a complementary stream of gas (preferably comprising the reactive gases) 74 passing through the distributor 71.

The flow rate of the different gas flows and the duration of injection into the nozzles are regulated so that the medium remains fluidized.

The invention claimed is:

1. A process for producing carbon nanotubes, comprising
   a) synthesizing alcohol(s) by fermentation of at least one vegetable matter and purifying the product obtained so as to obtain ethanol;
   b) dehydrating the ethanol obtained in a) to produce, in a first reactor, a mixture of ethylene and water and optionally purifying the product obtained;
   c) introducing, in a second reactor, a powdery catalyst at a temperature ranging from 500 to 700° C., the catalyst comprising iron supported by an inert solid substrate, the grains of catalyst having a d50 of less than 300 μm, wherein the powdery catalyst is produced by impregnating the solid substrate with an aqueous solution of iron then calcination of the solid substrate thus impregnated at a temperature of 200° C. to 400° C.;
   d) mixing ethylene with a flow of hydrogen and optionally with at least part of the water produced during the dehydrating of the ethanol in b) and then bringing said mixture into contact with the powdery catalyst of c), in a fluidized bed, to produce hydrogen and form carbon nanotubes on the surface of said catalyst by catalytic decomposition of ethylene;
   e) recovering the carbon nanotubes produced in d), wherein the hydrogen produced in d) is conveyed at least in part to a thermal oxidizer for combustion of the gases produced during stages a) to e).

2. A process according to claim 1, wherein c), d) and e) are implemented continuously and simultaneously in the second reactor.

3. A process according to claim 1, wherein the vegetable matter is selected from beet; sugar cane; cereals such as corn, wheat, barley and sorghum; potatoes; and biomass.

4. A process according to claim 3, wherein the cereal is corn.

5. A process according to claim 1, wherein b) is carried out by means of a catalyst based on γ-alumina.

6. A process according to claim 1, wherein the hydrogen produced in d) is recycled at least in part into the second reactor.

7. A process according to claim 1, wherein the d50 of the grains of powdery catalyst is less than 200 μm.

8. A process according to claim 1, wherein the d50 of the grains of powdery catalyst is greater than 100 μm.

* * * * *